United States Patent [19]

Kanda et al.

[11] Patent Number: 5,060,515
[45] Date of Patent: Oct. 29, 1991

[54] IMAGE SIGNAL PROCESSING CIRCUIT FOR ULTRASONIC IMAGING APPARATUS

[75] Inventors: Ryoichi Kanda, Ootawara; Takeshi Sato, Tochigi, both of Japan

[73] Assignee: Kabushiki Kaisha Toshiba, Kawasaki, Japan

[21] Appl. No.: 486,742

[22] Filed: Mar. 1, 1990

[30] Foreign Application Priority Data

Mar. 1, 1989 [JP] Japan .................................. 1-49411
May 18, 1989 [JP] Japan ................................ 1-125302

[51] Int. Cl.$^5$ .................................... G01N 29/00
[52] U.S. Cl. ..................................... 73/602; 382/6; 128/660.01
[58] Field of Search .................. 382/6; 358/112; 128/660.01, 660.07; 364/413.25; 73/602

[56] References Cited

U.S. PATENT DOCUMENTS

4,750,367  6/1988  Bernatets ........................... 73/602
4,785,818  11/1988 Hardin ........................... 128/660.07

Primary Examiner—Leo H. Boudreau
Assistant Examiner—Steven P. Klocinski
Attorney, Agent, or Firm—Cushman, Darby, Cushman

[57] ABSTRACT

An image signal processing circuit for an ultrasonic imaging apparatus includes a frame correlation circuit for performing, in accordance with a predetermined correlation coefficient, a frame correlation process for an ultrasonic frame image signal output from an ultrasonic transmitter/receiver circuit, and a correlation coefficient output circuit for outputting a frame correlation coefficient corresponding to a difference between a current input frame image signal and an immediately preceding frame image signal, i.e., a coefficient which decreases as the difference increases to the frame correlation circuit.

15 Claims, 6 Drawing Sheets

FIG. 9

IMAGE SIGNAL PROCESSING CIRCUIT FOR ULTRASONIC IMAGING APPARATUS

BACKGROUND OF THE INVENTION

1. Field of the Invention

The present invention relates to an image signal processing circuit and, more particularly, to an image signal processing circuit for an ultrasonic imaging apparatus.

2. Description of the Related Art

An ultrasonic imaging apparatus is used to scan a subject by an ultrasonic beam output from an ultrasonic transducer probe, to convert an echo signal into an image signal, and to display a tomographic image of the subject on a monitor.

A signal processing circuit for filtering an image signal is generally provided in the ultrasonic imaging apparatus in order to remove noise components. As the signal processing circuit, a frame correlation circuit for performing a frame correlation process for an image signal is used. The frame correlation circuit processes an image signal by multiplying the image signal by a fixed frame correlation coefficient.

In a conventional signal processing circuit, i.e., a frame correlation circuit for an ultrasonic imaging apparatus, however, a correlation coefficient cannot be increased in order to prevent image sharpness problems caused by a motion of a subject. For this reason, no satisfactory noise removing effect can be obtained.

SUMMARY OF THE INVENTION

It is an object of the present invention to provide a signal processing circuit for an ultrasonic imaging apparatus, which can prevent image sharpness problems caused by motion and obtain a satisfactory noise removing effect.

According to the present invention, there is provided an image signal processing circuit for an ultrasonic imaging apparatus, comprising: a frame correlation circuit for performing a frame correlation process for an ultrasonic image signal; and a coefficient output circuit for changing a frame correlation coefficient of the frame correlation circuit in accordance with a difference between an input frame image signal and an immediately preceding frame image signal.

The frame correlation circuit receives an input frame image signal, performs the frame correlation process for the image signal by multiplying the image signal by the frame correlation coefficient, and outputs the processed image signal to a frame memory. The coefficient output circuit calculates a difference between the input frame image signal and the immediately preceding image signal in the frame memory, and outputs a correlation coefficient corresponding to the calculated difference to the frame correlation circuit. That is, the input frame image signal is correlation-processed by a frame correlation coefficient corresponding to a subject's motion.

According to the present invention, an ultrasonic imaging apparatus for transmitting an ultrasonic wave from an ultrasonic transducer probe to a subject and receiving the ultrasonic echo from the subject, detecting a reception signal obtained by ultrasonic wave transmission and converting the signal into a digital signal by an A/D converter, and performing a frame correlation process for data of a immediately preceding frame from a frame memory and current frame data by a frame correlation circuit, thereby obtaining ultrasonic information, comprises the following an absolute value calculating circuit for calculating a difference between each pixel data of a frame from the A/D converter and each corresponding pixel data of the frame from the frame memory, and calculating an absolute value of the difference, a normalizing circuit for normalizing the difference of the absolute value of each pixel from the absolute value calculating circuit by a maximum value of the pixel data, an averaging circuit for accumulating the normalized values from the normalizing circuit for each frame and averaging the accumulated value, and a command circuit for determining motion detection on the basis of the average value from the averaging circuit and commanding the frame correlation circuit to enhance/weaken the frame correlation process.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrates presently preferred embodiments of the invention and, together with the general description given above and the detailed description of the preferred embodiments given below, serve to explain the principles of the invention.

DETAILED DESCRIPTION OF THE PREFERRED EMBODIMENTS

Figures 1, 2:
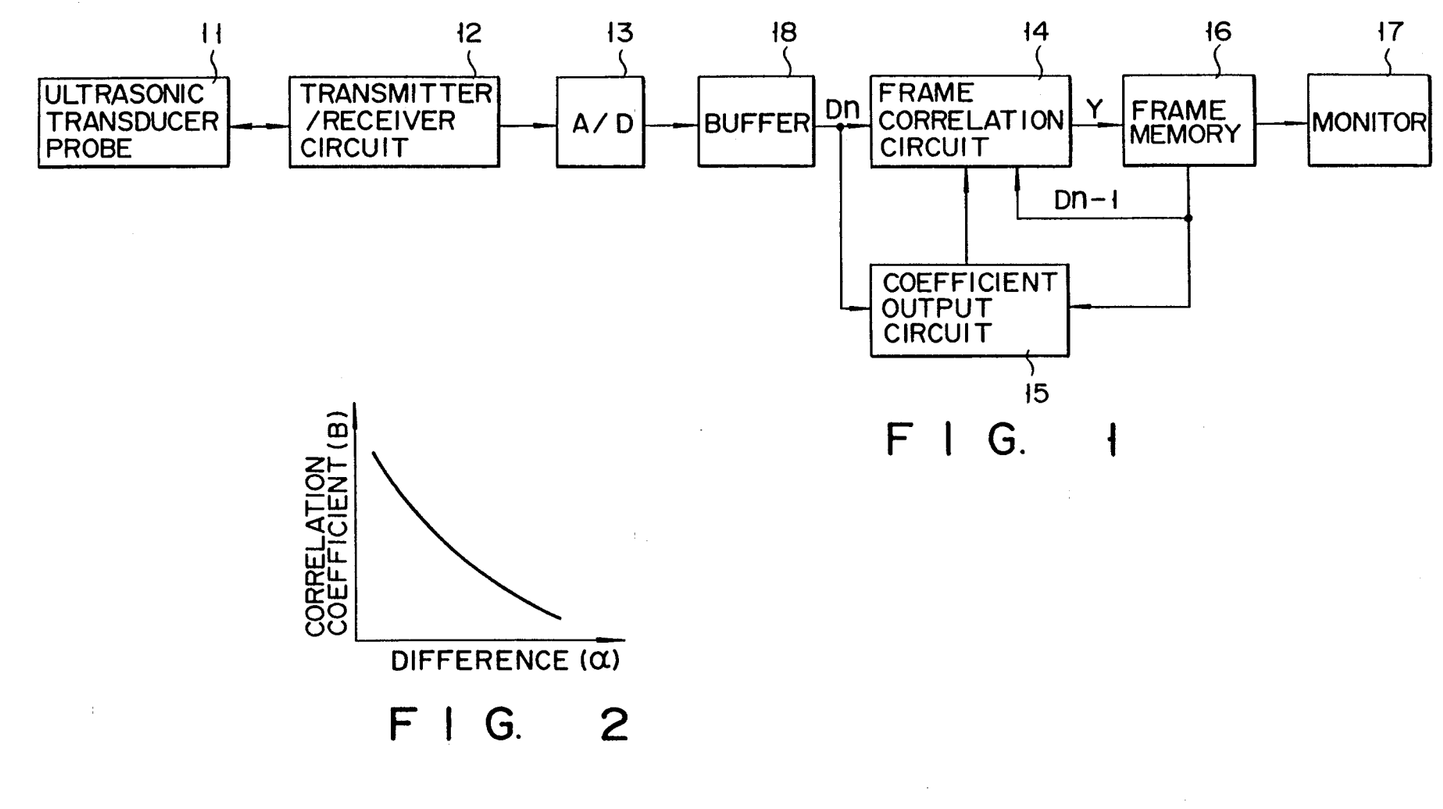
FIG. 1 is a block diagram showing an ultrasonic imaging apparatus using an image signal processing circuit according to an embodiment of the present invention.
FIG. 2 is a graph showing a relationship between an interframe difference and a correlation coefficient.

According to an embodiment shown in FIG. 1, the output terminal of an ultrasonic transducer probe 11 is connected to the I/O terminal of an ultrasonic transmitter/receiver circuit 12. The transmitter/receiver 12 supplies drive pulses to the probe 11, and receives an echo signal output from the probe 11 and converts the echo signal into an image signal.

The output terminal of the transmitter/receiver 12 is connected to the input terminals of a frame correlation circuit 14 and a coefficient output circuit 15 via an A/D converter 13 and a buffer 18. The frame correlation circuit 14 filters an image signal in accordance with a correlation coefficient. The coefficient output circuit 15 outputs a correlation coefficient corresponding to a difference $\alpha$ ($=Dn-Dn-1$) between an input frame image signal and an immediately preceding frame image signal. The circuit 15 can be constituted by a subtracter and a memory storing a table showing a relationship between difference information and a correlation coefficient.

The output terminal of the frame correlation circuit 14 is connected to a frame memory 16. The memory 16 stores a correlation-processed image signal, and reads out stored image information to the frame correlation circuit 14 and the coefficient output circuit 15 and outputs the information to a monitor 17.

An operation of the above embodiment will be described below.

When the transmitter/receiver circuit 12 supplies drive pulses for ultrasonic scanning to the ultrasonic transducer probe 11, the probe 11 radiates an ultrasonic beam to perform, e.g., sector scanning for a subject. Upon sector scanning, the probe 11 outputs an echo signal to the transmitter/receiver circuit 12. The circuit 12 amplifies and delays the echo signal to convert the echo signal into an image signal (B mode signal). The A/D converter 13 converts the image signal into a digital image signal and supplies the converted signal to the buffer 18. The image signal stored in the buffer 18 is supplied to the frame correlation circuit 14. The circuit 14 correlation-processes the image signal in accordance with the correlation coefficient output from the coefficient output circuit 15. That is, the circuit 14 performs a calculation of $Y = A \cdot Dn + B \cdot Dn - 1$ for each pixel and outputs processed image information Y. In this case, as shown in FIG. 2, as the difference $\alpha$ increases, i.e., a motion is increases, and a coefficient B to be multiplied with an immediately preceding image signal (Dn−1) decreases. Therefore, an influence of immediately preceding image information on an input image signal is reduced to prevent image sharpness problems caused by a motion. Note that A and B satisfy a relation of $A + B = 1$. That is, if B changes, A changes.

The image information Y output from the frame correlation circuit 14 is stored in the frame memory 16. The image information read out from the memory 16 is input to the monitor 17 and displayed as a tomographic image.

According to this embodiment, since the correlation coefficients differs in respective portions of the image, an unnatural image may be displayed. In addition, if an image is dark, since the difference is small, the correlation coefficient will be likely increased to cause image sharpness problems in the image.

Figure 3:
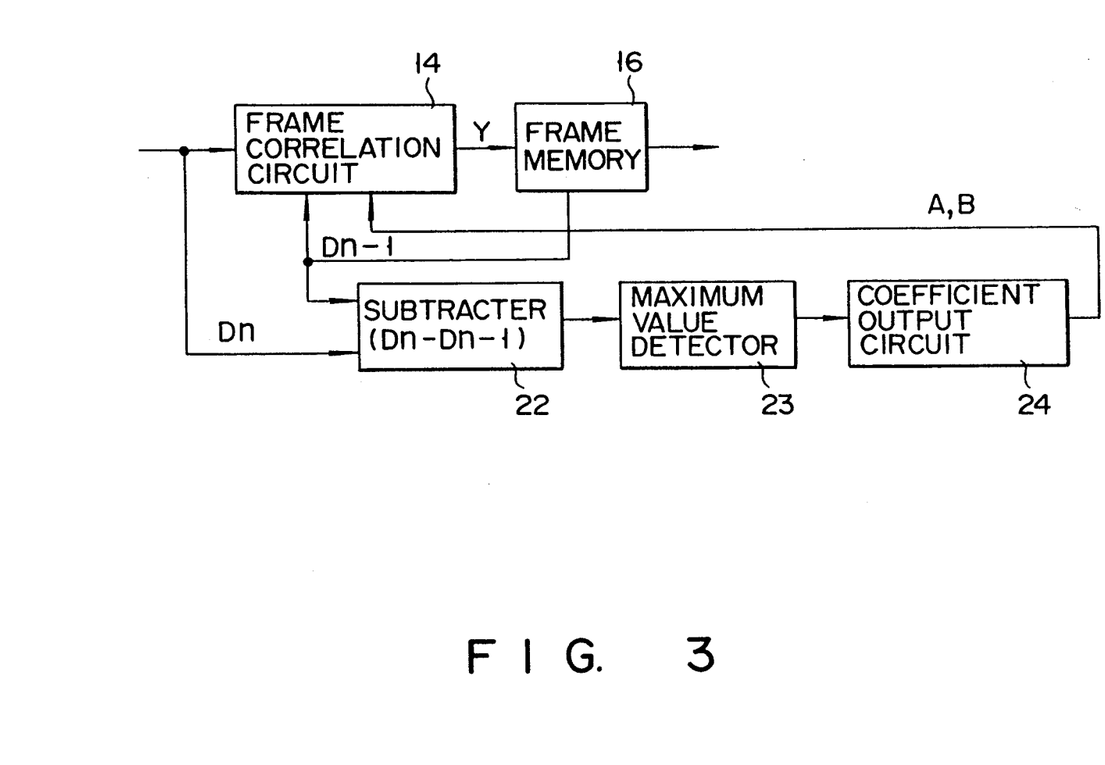
FIG. 3 is a block diagram showing an image signal processing circuit according to still another embodiment of the present invention.

An embodiment shown in FIG. 3 improves the above drawbacks. According to this embodiment, an input frame image signal Dn and immediately preceding image information Dn−1 are input to a subtracter 22. The subtracter 22 calculates $|Dn-(Dn-1)|$ for each pixel to obtain a difference $\alpha$. The difference $\alpha$ is input to a maximum value detector 23. The detector 23 detects a maximum value of differences obtained from image signals of one frame and outputs the maximum value difference to a coefficient output circuit 24. The circuit 24 outputs a correlation coefficient corresponding to the maximum difference to a frame correlation circuit 14. That is, according to this embodiment, the correlation coefficient is determined by the maximum value difference obtained for all pixels in one frame. When the correlation coefficient is determined in this manner, the correlation coefficient can be determined for the entire frame. Therefore, the correlation coefficient is not adversely affected by noise components in each portion. In addition, since a motion is detected in a high gradation portion, image sharpness problems due to motion in a low gradation portion can be prevented. Especially in ultrasonic scanning for an abdomen or the like, the entire image moves at the same time an ultrasonic transducer probe moves. This entire motion, however, has no influence on determination of the correlation coefficient since the maximum value is detected as described above.

Figure 4:
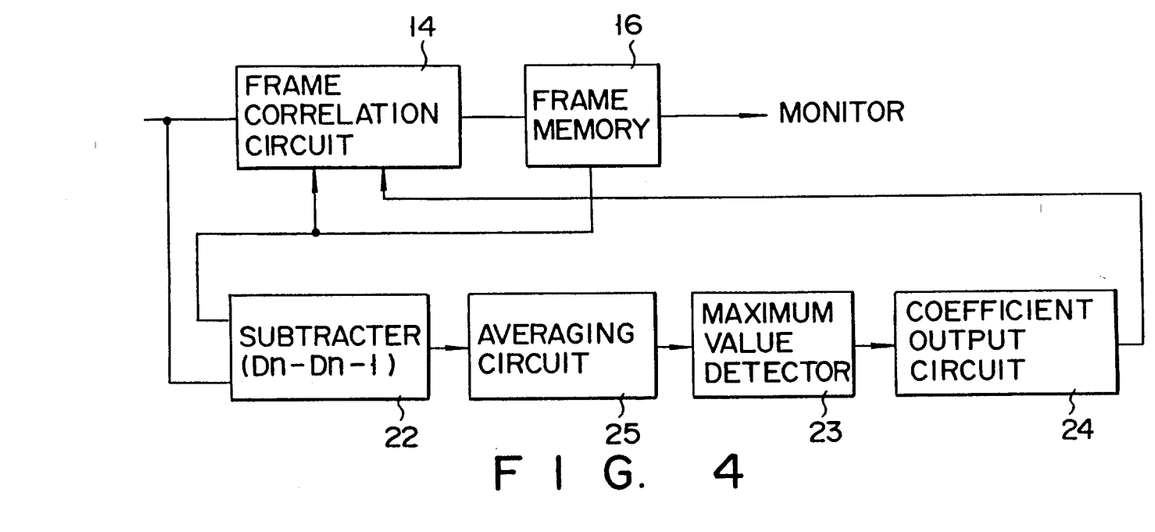
FIG. 4 is a block diagram showing an image signal processing circuit according to still another embodiment of the present invention.
Figure 5A:
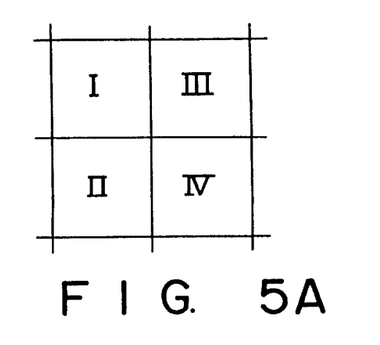
FIGS. 5A and 5B are views for explaining how to form blocks of pixels.

According to an embodiment shown in FIG. 4, an image signal of one frame is divided into a plurality of blocks, an average value of pixels of each block is obtained, and a correlation coefficient is determined on the bases of the average value. That is, a difference obtained for each pixel by a subtracter 22 is used to obtain an average value of pixels by an averaging circuit 25 for each of blocks I, II, III, IV . . . , each including several to several tens of pixels as shown in FIG. 5A. The average values are input to a maximum value detector 23 to detect a maximum average value of the average values of all the blocks. A coefficient output circuit 24 receives the maximum average value and outputs a correlation coefficient corresponding to the maximum average value to a frame correlation circuit 14. Since the average value is obtained for each block and the correlation coefficient is determined on the basis of the average values as described above, extreme correction caused by a large image difference at an edge portion of an image can be prevented to obtain a natural image.

Figure 5B:
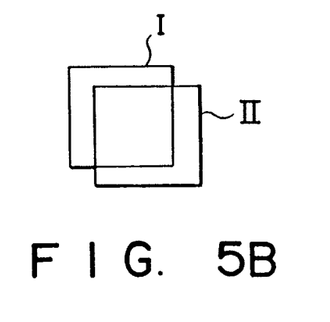

Note that an arrangement may be modified such that a block is formed to have each pixel as the center as shown in FIG. 5B to obtain an average value of each block, and a correlation coefficient is determined on the basis of a maximum value of the average values of the blocks.

According to the embodiment shown in FIG. 4, similar to the embodiment shown in FIG. 3, a noise generation pattern does not differ between the respective portions, and a motion is detected in a high gradation portion. Therefore, image sharpness problems due to motion in a low gradation portion can be prevented. In addition, since an average value of $|Dn-(Dn-1)|$ is used, an influence of noise having a large amplitude or a slight motion at a sharp edge can be prevented.

In the above embodiment, a primary IIR is used in the frame correlation process. The same effects, however, can be obtained by using another linear filter such as a secondary IIR.

In the above embodiment, since the correlation coefficient is determined in accordance with a difference between an input image and an immediately preceding image in order to correlation-process an image signal, a satisfactory noise removing effect can be obtained to prevent image sharpness problems caused by a motion.

An ultrasonic imaging apparatus according to still another embodiment of the present invention will be described below with reference to FIG. 6.

Figure 6:
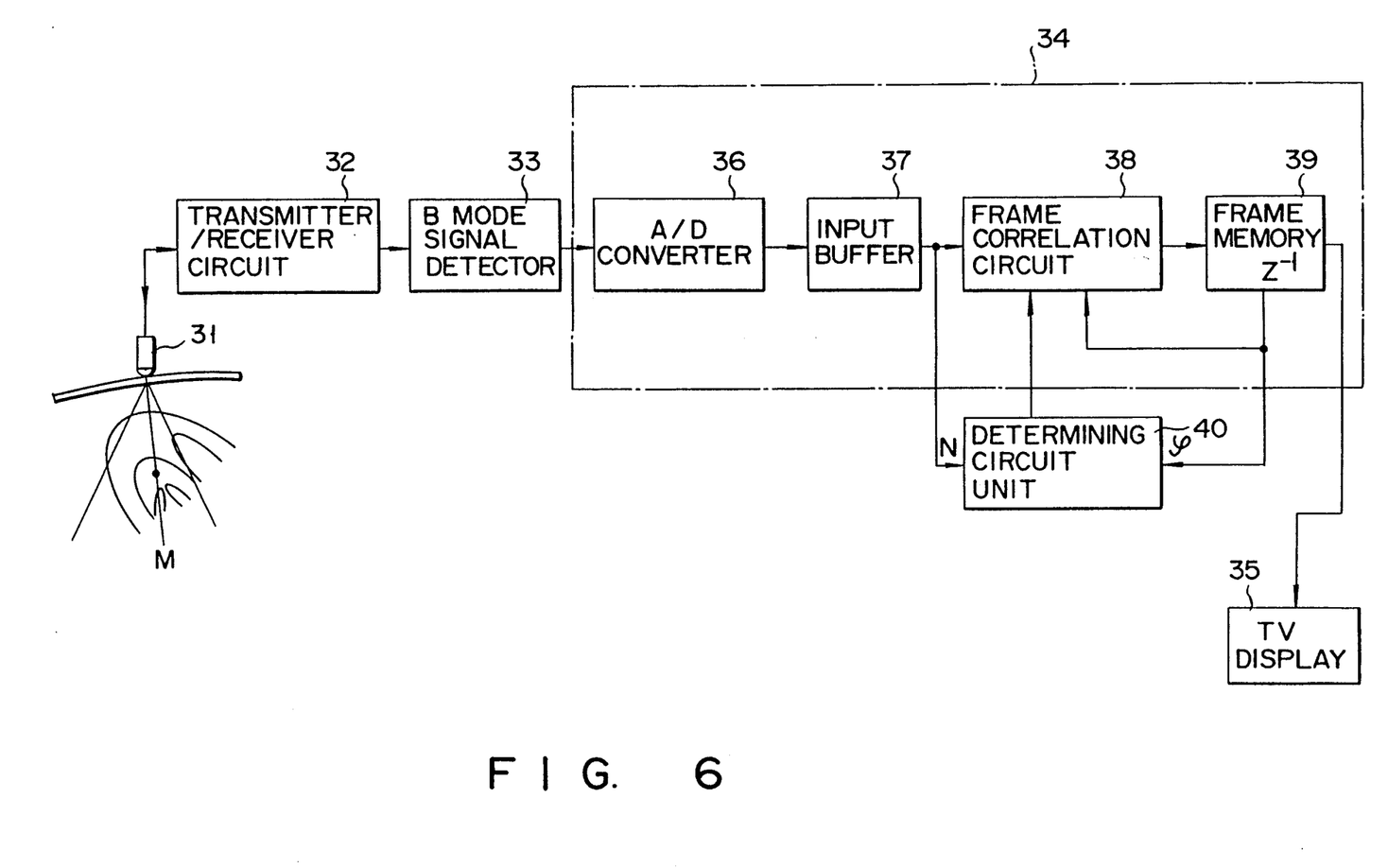
FIG. 6 is a block diagram showing an ultrasonic imaging apparatus according to still another embodiment of the present invention.
Figure 7:
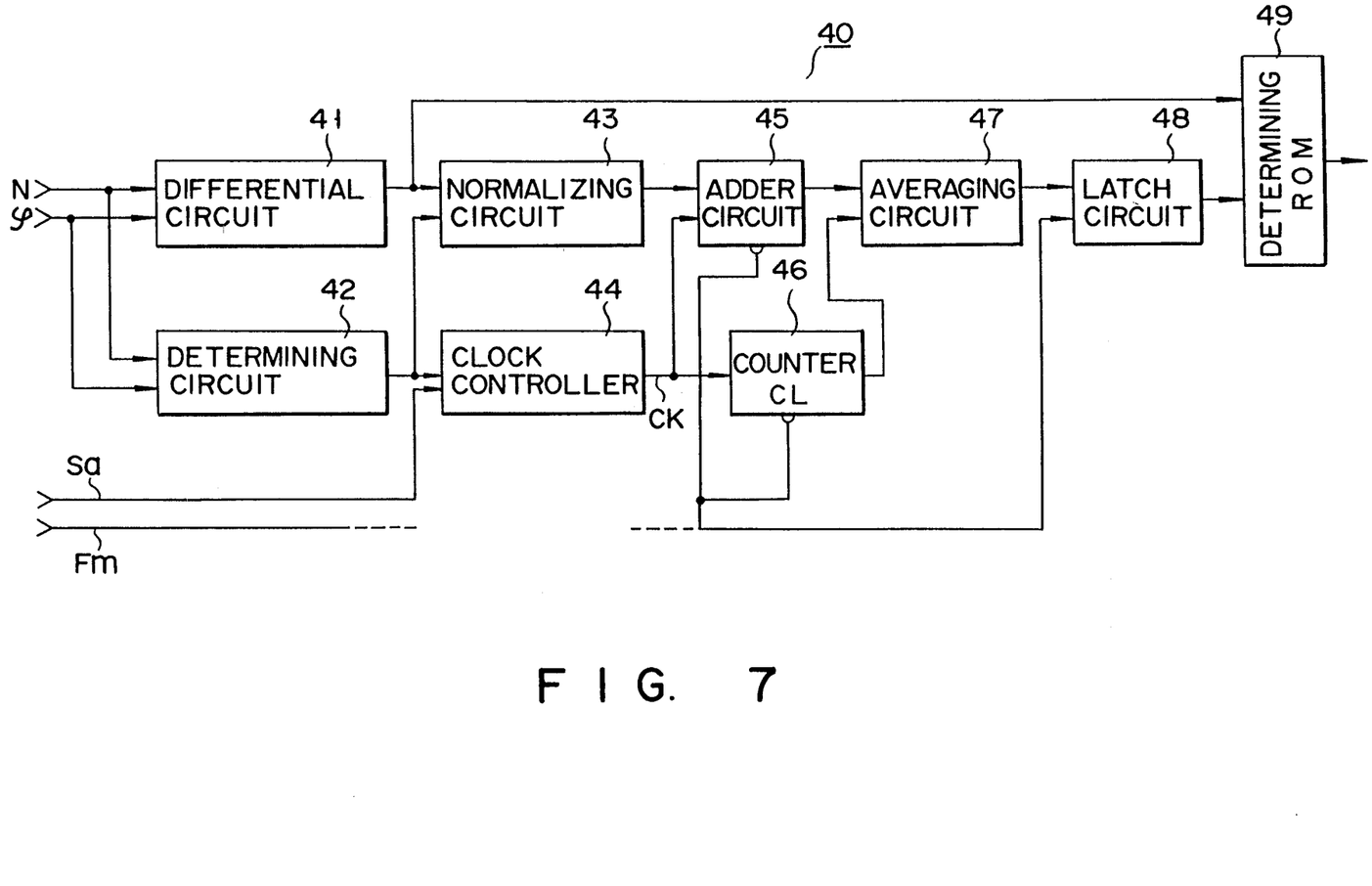
FIG. 7 is a block diagram showing a determining circuit.

Referring to FIG. 6, an ultrasonic transducer probe 31 is connected to a transmitter/receiver circuit 32, and the output terminal of the circuit 32 is connected to a B mode detector 33. The output terminal of the detector 33 is connected to the input terminal of a DSC (digital scan converter) 34. The DSC 34 is constituted by an A/D converter 36, an input buffer 37, a frame correlation circuit 38, and a frame memory 39 which are sequentially connected. The A/D converter 36 converts a signal supplied from the B mode detector 33 into a digital signal. The frame correlation circuit 38 adds immediately preceding frame data stored in the frame memory 39 to current frame data supplied from the input buffer 37, thereby performing a frame correlation process. The output terminals of the buffer 37 and the memory 39 are connected to a determining circuit unit 40. The unit 40 is arranged as shown in FIG. 7.

Figure 8:
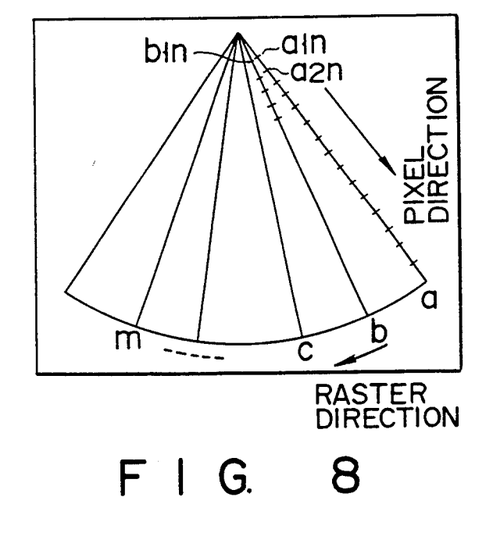
FIG. 8 is a view showing current frame data supplied from an A/D converter and each pixel data.
Figure 9:
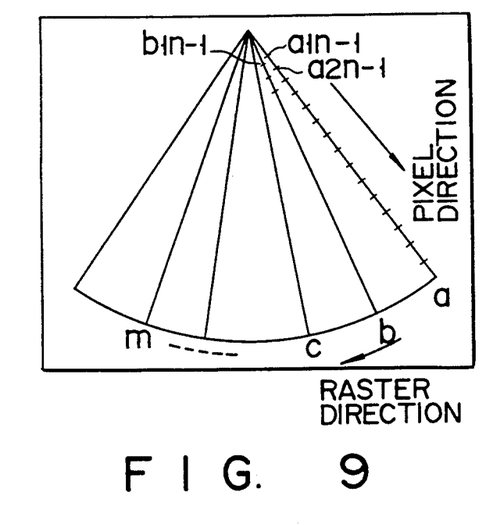
FIG. 9 is a view showing data of an immediately preceding frame in a frame memory and each pixel data corresponding to the each pixel data in FIG. 8.

The determining circuit unit 40 comprises a differential circuit 41 and a determining circuit 42 for receiving pixel data N from the buffer 37 and pixel data from the memory 39. The differential circuit 41 obtains a difference between each pixel data of a frame shown in FIG. 8 output from the A/D converter 36 and each pixel data of a frame shown in FIG. 9 output from the memory 39 and obtains an absolute value of the difference value. The determining circuit unit 40 determines the magnitudes of each pixel data of the frame output from the A/D converter 36 and each pixel data output from the memory 39 and outputs largest data (maximum value) of these magnitude difference data.

The output terminal of the differential circuit 41 is connected to the input terminals of a normalizing circuit 43 and a determining ROM 49. The output terminal of the determining circuit 42 is connected to the input terminals of the normalizing circuit 43 and a clock controller 44. The circuit 43 divides the difference absolute value of each pixel supplied from the differential circuit 41 by the maximum value supplied from the determining circuit 42, thereby normalizing the difference data. The controller 44 outputs a clock signal CK corresponding to a magnitude determination result supplied from the determining circuit 42 and a pixel signal Sa.

The output terminals of the normalizing circuit 43 and the clock controller 44 are connected to a adder 45. In response to the clock signal CK supplied from the controller 44 and a frame signal Fm, the adder 45 sums the normalized difference absolute value supplied from the normalizing circuit 43 in units of frames. A counter 46 connected to the controller 44 counts pixel differences in response to the clock signal CK supplied from the clock controller 44 and is reset in response to the frame signal Fm.

The output terminals of the adder 45 and the counter 46 are connected to the input terminal of an averaging circuit 47. The circuit 47 averages the addition output from the adder 45 in accordance with the count of the counter 46. The output terminal of the circuit 47 is connected to the input terminal of a latch circuit 48. The circuit 48 temporarily stores addition average data supplied from the averaging circuit 47. The determining ROM 49 determines a coefficient corresponding to a moving amount in accordance with the average data supplied from the latch circuit 48 and the difference absolute value supplied from the differential circuit 41, that is, reads out a coefficient for enhancing/weakening frame correlation to the frame correlation circuit 38 by using the determination result (moving amount) as an address.

An operation of the embodiment shown in FIGS. 6 and 7 will be described below.

When the ultrasonic transducer probe 31 is driven by the transmitter/receiver circuit 32, the probe 31 transmits ultrasonic pulses to a living body. An ultrasonic wave reflected by the living body is received by the probe 31 and the circuit 32 and input to the B mode detector 33. The reception signal is envelope-detected by the detector 33 and input to the DSC 34. The B mode data is converted into a digital signal by the A/D converter 36 of the DSC 34 and input to the frame correlation circuit 38 via the input buffer 37. At the same time, the digital data N supplied from the input buffer 37 and the immediately preceding data $\phi$ supplied from the frame memory 39 are input to the determining circuit unit 40.

In the unit 40, the differential circuit 41 calculates difference value $N - \phi$ between the data N and $\phi$. The difference value $N - \phi$ is converted into an absolute value $|N - \phi|$. The determining circuit 42 determines the magnitudes of the data N and $\phi$ and obtains a maximum value of each pixel. The normalizing circuit 43 divides the difference absolute value $|N - \phi|$ from the differential circuit 41 by the maximum value M from the determining circuit 42, thereby normalizing the difference data ($|N - \phi|/M$). The clock controller 44 outputs the clock signal CK corresponding to the pixel signal Sa, when the maximum value M from the determining circuit 42 is larger than a predetermined value. In accordance with the clock signal CK from the clock controller 44 and the frame signal Fm, the adder 45 sums the normalized difference absolute values $|N - \phi|/M$ from the normalizing circuit 43 in units of frames. The counter 46 counts pixels in response to the clock signal CK and the frame signal Fm. In response to this count, the averaging circuit 47 averages the addition values supplied from the adder 45. The latch circuit 48 temporarily stores the average data from the averaging circuit 47. The determining ROM 49 determines a moving amount in accordance with the addition average data from the latch circuit 48 and the difference absolute value from the differential circuit 41. In accordance with the determination result, a coefficient for enhancing/weakening the frame correlation is stored in the frame correlation circuit 38. That is, a corresponding coefficient is output from the ROM 4 to the frame correlation circuit 38 to change the magnitude of the frame correlation of the circuit 38. Data subjected to the frame correlation process is written in the frame memory 39, converted into a TV signal, and then displayed as an ultrasonic image on a TV display 35.

According to the above embodiment, when the difference absolute value between immediately preceding frame data and current frame data is normalized, the normalized value has a relatively large value, if the difference absolute value has been decreased, since the current and immediately preceding frame data are small. Therefore, even a small motion can be easily detected. Since the normalized difference absolute values ar added and averaged in units of frames, no spatial distortion occurs. In addition, since noise components are not determined to be a motion, an S/N ratio of an image can be significantly improved. A motion is determined by this average value, and the magnitude of frame correlation can be varied in accordance with the determination result. Therefore, no motion image sharpness problems due to occurs even in a moving picture to result in a good ultrasonic image. In addition, since the unnormalized difference absolute value is also used i determination of a motion, this difference absolution value more or less has an influence on determination of the frame correlation value, i.e., the magnitude of the correlation. That is, in a pixel point having a large frame correlation value, motion has a great influence on image sharpness problems. Therefore, only a change in pixel point having a large correlation value can be increased by using an unnormalized difference absolute value.

Additional advantages and modifications will readily occur to those skilled in the art. Therefore, the invention in its broader aspects is not limited to the specific details, and representative devices shown and described. Accordingly, various modifications may be made without departing from the spirit or scope of the general inventive concept as defined by the appended claims and their equivalents.

What is claimed is:

1. An image signal processing circuit for an ultrasonic imaging apparatus, comprising:
   receiving means for sequentially receiving a plurality of frame image signals each including a plurality of pixels;
   frame correlation processing means for performing a frame correlation process for the frame image signals in accordance with a predetermined correlation coefficient; and
   coefficient outputting means for changing the predetermined correlation coefficient of the frame correlation processing means in accordance with a difference between current input frame image signals and preceding frame image signals from the receiving means, said coefficient output means comprising:
      difference detecting means for detecting a difference between the current input frame image signals and immediately preceding frame image signals,
      detecting means for detecting a maximum value of differences obtained by said difference detecting means, and
      output means for outputting a coefficient corresponding to the maximum value.

2. An image signal processing circuit for an ultrasonic imaging apparatus, comprising:
   receiving means for sequentially receiving a plurality of frame image signals each including a plurality of pixels;
   frame correlation processing means for performing a frame correlation process for the frame image signals in accordance with a predetermined correlation coefficient; and
   coefficient outputting means for changing the predetermined correlation coefficient of the frame correlation processing means in accordance with a difference between current input frame image signals and preceding frame image signals from the receiving means, said coefficient output means comprising:
      difference output means for calculating a difference between the current input frame image signals and immediately preceding frame image signals for each pixel and outputting a plurality of difference data,
      averaging means for dividing the difference data corresponding to a plurality of pixels into a plurality of blocks and calculating an average value of the difference data of each block,
      detecting means for detecting a maximum value of the average values, and
      output means for outputting a coefficient corresponding to the maximum average value.

3. A circuit according to claim 2, wherein each of said blocks is formed to have each pixel as the center.

4. A circuit according to claim 2, wherein said coefficient output means comprises output means for outputting a coefficient which is decreased as a difference obtained by said difference output means is increased.

5. An image signal processing circuit for an ultrasonic diagnostic apparatus, comprising:
   receiving means for sequentially receiving a plurality of frame image signals;
   correlation means for frame-correlating the current frame image signal currently received by said receiving means with the preceding frame image signal previously received by said receiving means, and outputting ultrasonic image data;
   absolute value calculating means for calculating a difference between each pixel data of the current frame image signal and each pixel data of the immediately preceding frame image signal, calculating an absolute value of the difference, and outputting a difference absolute value for each pixel;
   normalizing means for normalizing the difference absolute value obtained by said absolute value calculating means by a maximum value of the pixel data, to output normalized values;
   averaging means for suming the normalized values from said normalizing means for each frame to output sum values corresponding to a plurality of frames and calculating an average value of the sum values; and
   coefficient output means for determining a motion of an image on the basis of the average value from said averaging means and outputting a frame correlation coefficient corresponding to a determination result to said frame correlating means.

6. A circuit according to claim 5, wherein said coefficient output means comprises determining means for determining a motion of the image on the basis of the difference absolute value and the average value, and memory means for storing a plurality of correlation coefficients and reading out a correlation coefficient corresponding to the determination result obtained by said determining means.

7. A circuit according to claim 5, wherein said receiving means comprises receiving means for receiving a B mode frame image signal.

8. An ultrasonic imaging apparatus comprising:
   ultrasonic transmitting/receiving means for scanning a subject by an ultrasonic beam and outputting a plurality of ultrasonic image signals each including a plurality of pixels;
   correlation processing means for correlation-processing the ultrasonic image signals in accordance with a predetermined correlation coefficient and outputting ultrasonic image data;
   coefficient output means for outputting the correlation coefficient corresponding to a difference between the ultrasonic image signals currently produced and the ultrasonic image signals previously produced from said ultrasonic transmitting/receiving means to the correlation processing means, said coefficient output means comprising:
      difference detecting means for detecting a difference between a current image signal and a preceding image signal for each pixel,
      detecting means for detecting a maximum value of differences obtained by said difference detecting means, and output means for outputting a coefficient corresponding to the maximum value; and display means for displaying the ultrasonic image data output from said correlation processing means as an image.

9. An ultrasonic imaging apparatus comprising:

ultrasonic transmitting/receiving means for scanning a subject by an ultrasonic beam and outputting a plurality of ultrasonic image signals each including a plurality of pixels;

correlation processing means for correlation-processing the ultrasonic image signals in accordance with a predetermined correlation coefficient and outputting ultrasonic image data;

coefficient output means for outputting the correlation coefficient corresponding to a difference between the ultrasonic image signals currently produced and the ultrasonic image signals previously produced from the ultrasonic transmitting/receiving means to the correlation processing means, said coefficient output means comprising:

difference output means for calculating a difference between a current image signal and a preceding image signal for each pixel and outputting a plurality of difference data, averaging means for dividing the difference data corresponding to a plurality of pixels into a plurality of blocks and calculating an average value of the difference data of each block, detecting means for detecting a maximum average value of the average value of each block, and means for outputting a coefficient corresponding to the maximum average value; and display means for displaying the ultrasonic image data output from said correlation processing means as an image.

10. An apparatus according to claim 9, wherein each of said blocks is formed to have each pixel as a center.

11. An apparatus according to claim 9, wherein said coefficient output means further comprises means for outputting a coefficient which is decreased as the difference obtained by said difference output means is increased.

12. An ultrasonic imaging apparatus comprising:

ultrasonic transmitting/receiving means for scanning a subject by an ultrasonic beam and outputting a plurality of ultrasonic image signals each including a plurality of pixels, said ultrasonic transmitting/receiving means outputting the image signals for each frame;

correlation processing means for correlation-processing the ultrasonic image signals in accordance with a predetermined correlation coefficient and outputting ultrasonic image data;

coefficient output means for outputting the correlation coefficient corresponding to a difference between an ultrasonic image signal currently produced and an ultrasonic image signal previously produced from said ultrasonic transmitting/receiving means to said correlation processing means, said coefficient output means comprising:

absolute value calculating means for calculating a difference between a current image signal and a preceding image signal for each pixel and calculating an absolute value of the difference, normalizing means for normalizing a difference absolute value calculated by said absolute value calculating means by a maximum value of the pixels and outputting a normalized value, averaging means for summing normalized values from said normalizing means for each frame to output a plurality of sum values corresponding to a plurality of frames and calculating an average value of the sum values, coefficient table means for determining a motion of an image on the basis of the average value from said averaging means and outputting a correlation coefficient indicative thereof to said correlation processing means; and display means for displaying the ultrasonic image data output from said correlation processing means as an image.

13. An apparatus according to claim 8, wherein said ultrasonic transmitting/receiving means comprises an ultrasonic transducer for radiating an ultrasonic beam and converting an echo of the ultrasonic beam into an echo signal, and a detector for envelope-detecting the echo signal and outputting a B mode image signal as the ultrasonic image signal.

14. An apparatus according to claim 9, wherein said ultrasonic transmitting/receiving means comprises an ultrasonic transducer for radiating an ultrasonic beam and converting an echo of the ultrasonic beam into an echo signal, and a detector for envelope-detecting the echo signal and outputting a B mode image signal as the ultrasonic image signal.

15. An apparatus according to claim 12, wherein said ultrasonic transmitting/receiving means comprises an ultrasonic transducer for radiating an ultrasonic beam and converting an echo of the ultrasonic beam into an echo signal, and a detector for envelope-detecting the echo signal and outputting a B mode image signal as the ultrasonic image signal.

* * * * *